Patented Mar. 16, 1937

2,074,010

UNITED STATES PATENT OFFICE 2,074,010

BITUMINOUS PAVEMENTS OF HIGH STRUCTURAL STRENGTH AND METHOD OF MAKING SAME

Charles M. Baskin, Montreal, Quebec, Canada, assignor to Standard Oil Development Company, a corporation of Delaware No Drawing. Application June 27, 1933, Serial No. 677,851

3 Claims. (Cl. 106—31)

This invention relates to the production of a bituminous pavement having certain of the desirable characteristics of rigid cement concrete pavements while retaining the desirable characteristics of bituminous paving mixtures.

A rigid pavement, as exemplified by cement concrete, has this outstanding characteristic, which is not found in current bituminous paving mixtures, namely, that for any unit volume the cement concrete has much higher structural strength in terms of compressive and beam strengths. This feature is of special importance in connection with primary or so-called permanent pavements when these are built in localities where the traffic load is extremely high. A rocky or otherwise naturally stable sub-soil does not require massive pavements; a wearing surface in the nature of a carpet is quite sufficient. Most soils, however, can be classified as unstable during the critical seasons of the year, such as the spring when the soil alternately freezes and thaws, and induces a movement known as spring heaving. Soils also become highly unstable by excess of water infiltration during periods when the water table is very high, reducing the bearing capacity and requiring a top that acts as a bridge.

While a completely rigid pavement, such as Portland cement concrete, serves its purpose admirably from the structural strength standpoint, it has the inherent deficiency that it cracks by expansion and contraction with temperature change.

An object of this invention is to produce bituminous pavements that are to all intents and purposes rigid solids at critical temperatures (32° to 35° F.) and have compressive and tensile strengths as high or higher than the usual Portland cement pavements.

Another object of this invention is to produce such strong bituminous pavements that have sufficient plasticity to conform and adjust themselves to expansion and contraction stresses without cracking.

Another object of this invention is to produce bituminous pavements that will retain a limited degree of plasticity sufficient to take care of expansion and contraction but rigid enough to retain a non-skid surface.

These and other objects of the invention will be clear from the following examples and description:

In the preferred form of the invention, an asphalt having the following physical characteristics is used:

Penetration, 100 gram load,
  5 seconds time at 32° F___ 0 or practically solid
Penetration, 100 gram load,
  5 seconds time at 77° F_____ 2-12
Penetration, 100 gram load,
  5 seconds time at 100° F_____ 10-80
Penetration, 100 gram load,
  5 seconds time at 140° F_____ 100-300

Expressed in float test at 140° F. the material does not move and can be classed as a plastic solid, which indicates that the bitumen incorporated in the pavement will not flow at summer temperatures even under the extreme squeezing action of high traffic impact.

This asphalt has the following viscosities:

|  | Seconds |
|---|---|
| Viscosity furol at 300° F | 60–200 |
| Viscosity furol at 350° F | 30–100 |
| Viscosity furol at 400° F | 20–70 |

The importance of low viscosity at mixing temperatures is that it insures that the bitumen will easily spread in infinitesimally fine films over and between the mineral matter particles (stone, sand and dust). To get the same degree of fluidity, film fineness and uniform distribution with the ordinary high viscosity asphalts currently used in bituminous hot mix paving it would be necessary to go to such high mixing temperatures that it would be an impractical operation.

Although the asphalt described above is preferred, other asphalts may be used provided they have the necessary fluidity. In all cases an asphalt should be selected which is well below the presently accepted viscosity of around 600 to 2,000 seconds furol at 300° F., 400 to 1,200 seconds at 350° F., and 300 to 700 seconds at 400° F. In general, asphalts suitable for the present invention have viscosities much lower than those just stated.

The asphalt is preferably mixed at an elevated temperature with a mineral aggregate having maximum size particles of about ¼", including all fines down to dust (material passing 200 mesh). The required quantity of asphalt is added and additional dust is also introduced to produce a mixture of high structural strength at low temperatures. Into this mixture is added a quantity of large mineral particles (1" to 2½" maximum size). The preferred proportions used are about 6% of the asphalt, 6% of the fine dust, 48% of the mineral aggregate having maximum size particles of ¼" and 40% of the coarse aggregate of from 1" to 2½" size particles. The hot mixture is then laid or placed on the road or street in forms such as are used in pouring concrete, to a thickness of about 8". While the paving mixture after spreading is still hot and in a fluid condition, a uniform layer of sand or other fine mineral matter is spread over it. Tamping or compaction is proceeded with on top of this layer of mineral matter so that the surface is uniformly roughened and non-skid.

It will be observed that this invention requires a complete departure from the ordinary method of laying bituminous pavements in several rolled layers of relatively slight thickness. By pouring a thick mass of the asphaltic mixture into forms and tamping, a "monolithic" structure is obtained.

The use of a low viscosity asphalt permits the incorporation of large aggregate without weakening the structure. The mixture of asphalt and fines described above may advantageously be used as a paving material of high structural strength. It has been discovered that the mixture so produced will carry up to 40% or more of large size aggregate. If it be attempted to mix asphalt, fines, and larger aggregate simultaneously, much more asphalt is required for equivalent strength.

The foregoing description is merely illustrative and alternative arrangement may be made within the scope of the appended claims in which it is my intention to claim all novelty as broadly as the prior art permits.

I claim:

1. The method of producing a paving mixture, which comprises mixing at an elevated temperature an asphalt of low penetration at 77° F. and low furol viscosity at 300° F. with a mineral dust that passes through a 200 mesh sieve and a mineral aggregate having maximum particles of less than ¼ inch, and adding to the resulting mixture and incorporating by mixing at an elevated temperature a mineral aggregate of 1½ to 2½ inches maximum size.

2. The method of producing a paving mixture, which comprises mixing at an elevated temperature about 6% of an asphalt of low penetration at 77° F. and low furol viscosity at 300° F., about 6% of fine mineral dust passing through a 200 mesh sieve, about 48% of mineral aggregate of ¼ inch maximum size particles, and about 40% of mineral aggregate of 1 to 2½ inch size particles.

3. The method of producing a paving mixture, which comprises mixing at an elevated temperature an asphalt of low penetration at 77° F. and low furol viscosity at 300° F. with a mineral aggregate having maximum size particles of about ¼", including all fines down to dust passing 200 mesh, and adding to the resulting mixture and incorporating by mixing at an elevated temperature a mineral aggregate of 1½ to 2½ inches maximum size.

CHARLES M. BASKIN.